United States Patent
Maybaum et al.

(10) Patent No.: US 8,430,315 B2
(45) Date of Patent: Apr. 30, 2013

(54) DATA ENCODING AND DECODING

(75) Inventors: William H. Maybaum, Fountain Hills, AZ (US); Robert L. Stewart, Wilton, NH (US); George E. Conant, Natick, MA (US)

(73) Assignee: SignaKey LLC, Clawson, MI (US)

( * ) Notice: Subject to any disclaimer, the term of this patent is extended or adjusted under 35 U.S.C. 154(b) by 141 days.

(21) Appl. No.: 12/826,374

(22) Filed: Jun. 29, 2010

(65) Prior Publication Data

US 2011/0315759 A1 Dec. 29, 2011

(51) Int. Cl.
*G06K 9/80* (2006.01)
*G06K 7/14* (2006.01)

(52) U.S. Cl.
USPC ..................................................... 235/462.1

(58) Field of Classification Search ... 235/462.01–462.1
See application file for complete search history.

(56) References Cited

U.S. PATENT DOCUMENTS

| | | |
|---|---|---|
| 4,786,940 A | 11/1988 | Daniele |
| 5,091,966 A | 2/1992 | Bloomberg et al. |
| 5,126,524 A | 6/1992 | Moro et al. |
| 5,128,525 A | 7/1992 | Stearns et al. |
| 5,168,147 A | 12/1992 | Bloomberg |
| 5,324,923 A | 6/1994 | Cymbalski et al. |
| 5,329,107 A | 7/1994 | Priddy et al. |
| 5,449,895 A | 9/1995 | Hecht et al. |
| 5,449,896 A | 9/1995 | Hecht et al. |
| 5,453,605 A | 9/1995 | Hecht et al. |
| 5,464,974 A | 11/1995 | Priddy et al. |
| 5,468,953 A | 11/1995 | Priddy et al. |
| 5,473,151 A | 12/1995 | Priddy et al. |
| 5,477,045 A | 12/1995 | Priddy et al. |
| 5,479,004 A | 12/1995 | Priddy et al. |
| 5,484,999 A | 1/1996 | Priddy et al. |
| 5,521,372 A | 5/1996 | Hecht et al. |
| 5,572,010 A | 11/1996 | Petrie |
| 5,576,532 A | 11/1996 | Hecht |
| 5,611,575 A | 3/1997 | Petrie |
| 5,694,102 A | 12/1997 | Hecht |
| 5,717,197 A | 2/1998 | Petrie |
| 5,771,245 A | 6/1998 | Zhang |
| 5,825,933 A | 10/1998 | Hecht |
| 5,862,255 A | 1/1999 | Davies et al. |
| 5,862,271 A | 1/1999 | Petrie |
| 5,870,510 A | 2/1999 | Hecht |
| 5,929,429 A | 7/1999 | Petrie |
| 5,937,110 A | 8/1999 | Petrie et al. |
| 5,939,703 A | 8/1999 | Hecht et al. |
| 2007/0029377 A1* | 2/2007 | Hinckley ...................... 235/380 |
| 2009/0078779 A1* | 3/2009 | Lapstun ....................... 235/494 |

OTHER PUBLICATIONS

Meiners, E.P., Lenz, L.L., Dalby, A.E., and Hornsby, J.M., Recommended Standards for Digital Tape Formats, Geophysics vol. 37, No. 01, 1972, pp. 36-44.

* cited by examiner

*Primary Examiner* — Thien M Le
*Assistant Examiner* — Christle Marshall
(74) *Attorney, Agent, or Firm* — Reising Ethington P.C.

(57) ABSTRACT

Systems and methods for encoding and decoding data is disclosed. The system may receive data, and may create a field of marks corresponding to the data, along with one or more identifiers corresponding to positions within the field of marks. A decoding system may receive the field of marks, and may decode the marks into data based at least in part on the one or more identifiers.

41 Claims, 9 Drawing Sheets

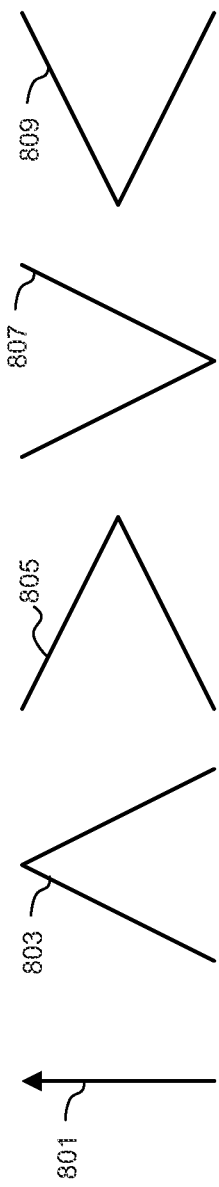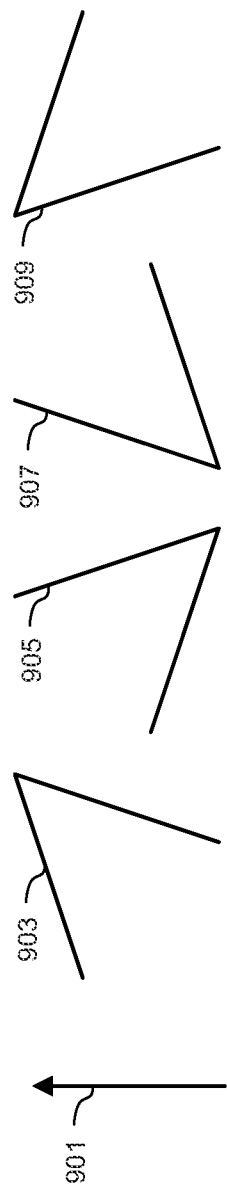

DATA ENCODING AND DECODING

FIELD OF THE DISCLOSURE

The present disclosure relates to data encoding and decoding. More particularly, the present disclosure relates to the use of marks to encode and decode data.

BACKGROUND OF THE DISCLOSURE

Laws or regulations may require that items be tracked. For example, regulations may require that a part is tracked so that it can be located and identified if it is later determined to be defective. A part marked with a unique number may be easily counterfeited by copying the number. Additionally, the use of numbers and/or letters to mark a part may require a large amount of space, if the part is to be marked with a unique number.

The use of marks, or symbols, may be used to create a field that encodes a unique identifier. A field of marks may be created that is both small in physical size, but yet encodes a large enough unique identifier that a large number of parts may be marked uniquely. However, a small mark with a high data density may be partially obliterated.

It may be advantageous to be able to mark an item with a unique identifier in the form of a field of marks, to allow item-specific tracking, but still retain the ability to decode all or a portion of the data if some of the field is obliterated. For at least these reasons, systems and methods which encode and decode data values in a field of marks are important for the management of items.

SUMMARY

According to the present disclosure, a method of generating an identifier is provided. The method includes the steps of receiving data, creating one or more error correcting codes for the data, associating the one or more error correcting codes with the data, and generating a field of one or more marks, the field of one or more marks encoding the data and the error correcting codes, wherein the one or more marks includes at least one row location identifier and at least one column location identifier, wherein the at least one row location identifier and the at least one column location identifier are included in the field of one or more marks.

According to another embodiment of the present disclosure, a system is provided for generating an identifier. The system may comprise a module operable to receive data, a module operable to create one or more error correcting codes for the data, a module to associate the one or more error correcting codes with the data, and a module to generate a field of one or more marks, the field of one or more marks encoding the data and the error correcting codes, wherein the one or more marks includes at least one row location identifier and at least one column location identifier, wherein the at least one row location identifier and the at least one column location identifier are included in the field of one or more marks.

According to yet another embodiment of the present disclosure, a method of decoding a field of marks is provided. The method may include the steps of receiving a field of one or more marks, the field of one or more marks encoding data and error correcting codes, wherein the one or more marks includes at least one row location identifier and at least one column location identifier, wherein the at least one row location identifier and the at least one column location identifier are included in the field of one or more marks in the field, converting the field of one or more marks into an image, and retrieving the data from the image, using the data and the error correcting codes in the field of one or more marks.

According to yet another embodiment of the present disclosure, a system for decoding a field of marks is provided. The system may include a module operable to receive a field of one or more marks, the field of one or more marks encoding data and error correcting codes, wherein the one or more marks includes at least one row location identifier and at least one column location identifier, wherein the at least one row location identifier and the at least one column location identifier are included in the field of one or more marks in the field, a module operable to convert the field of one or more marks into an image, and a module to retrieve the data from the image, using the data and the error correcting codes in the field of one or more marks.

Additional features and advantages of the present disclosure will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 8 is an exemplary selection of data marks according to an embodiment of the present disclosure;

FIG. 9 is an exemplary selection of row and column identifier marks according to an embodiment of the present disclosure.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION OF THE DRAWINGS

The embodiments of the disclosure described herein are not intended to be exhaustive or to limit the disclosure to the precise forms disclosed. Rather, the embodiments selected for description have been chosen to enable one skilled in the art to practice the subject matter of the disclosure. Although the disclosure describes specific configurations of systems and methods to encode and decode a field of marks, it should be understood that the concepts presented herein may be used in other various configurations consistent with this disclosure.

Figure 1:
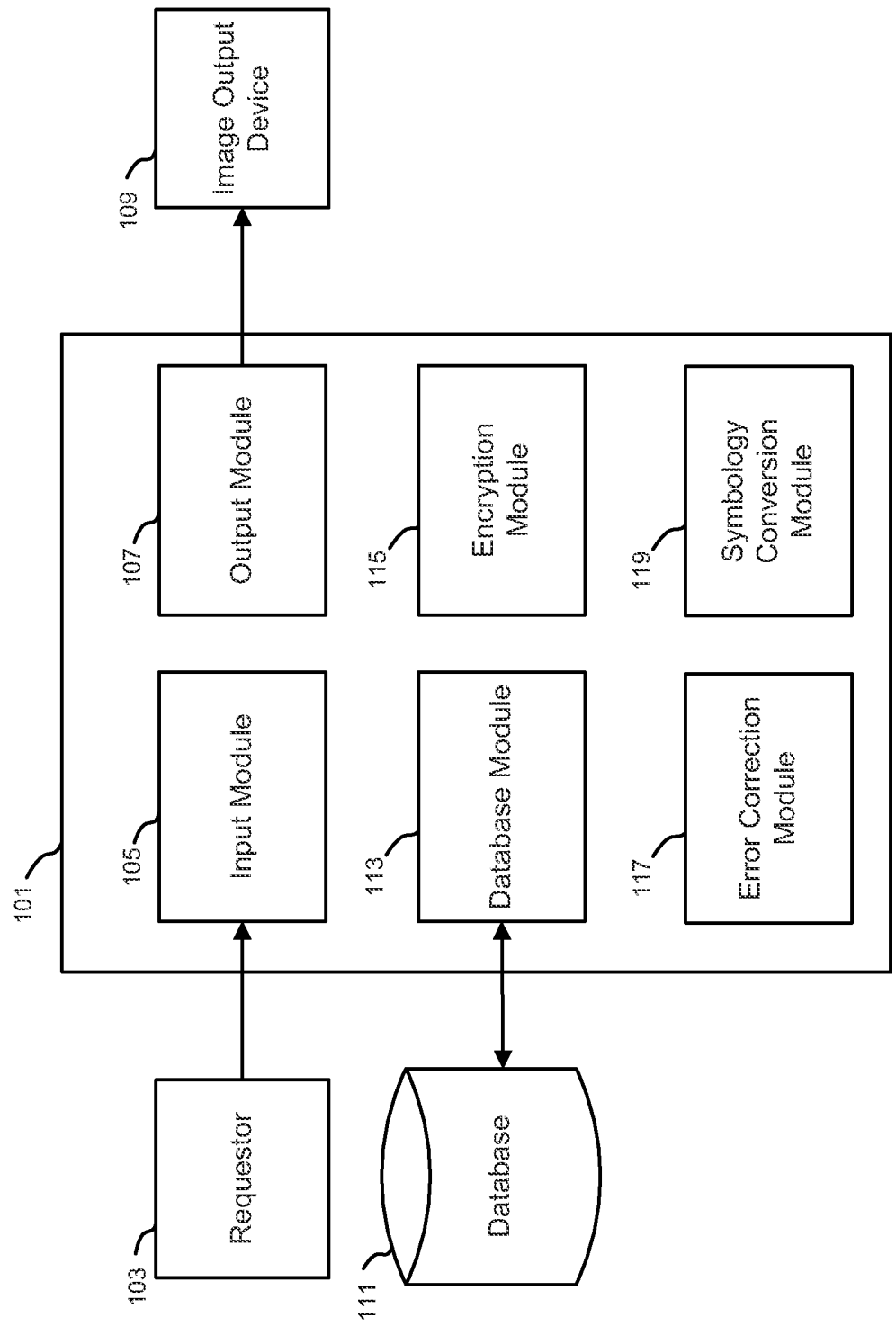
FIG. 1 is a component view of an exemplary encoding system according to an embodiment of the present disclosure.

Referring now to FIG. 1, a component view of an exemplary encoding system is shown according to an embodiment of the present disclosure.

The encoding system 101 may include an input module 105, a database module 113, an encryption module 115, an error correction module 117, a symbology conversion module 119, and an output module 107. The encoding system may be a single system, or may be two or more systems in communication with each other. The encoding system may include one or more input devices, one or more output devices, one or more processors, and memory associated with the one or more processors. The memory associated with the one or more processors may include, but is not limited to, memory associated with the execution of the modules, and memory associated with the storage of data. The encoding system may also be associated with one or more networks, and may communicate with one or more additional systems via the one or more networks. The modules may be implemented in hardware or software, or a combination of hardware and software. The encoding system may also include additional hardware and/or software to allow the encoding system to access the input devices, the output devices, the processors, the memory, and the modules. The modules, or a combination of the modules, may be associated with a different processor and/or memory, for example on distinct systems, and the systems may be located separately from one another. In one embodiment, the modules may be executed on the same system as one or more processes or services. The modules may be operable to communicate with one another and to share information. Although the modules are described as separate and distinct from one another, the functions of two or more modules may instead be executed in the same process, or in the same system.

The input module 105 may receive a request for data from a requestor 103. The requestor 103 may be one or more individuals interacting with the input module 105 via an interface. For example, and without limitation, the interface may be a keyboard, computer mouse, trackpad, touch sensitive screen or film, or other device used to generate an input. The input module 105 may also receive input over a network from another system. For example, and without limitation, the input module 105 may receive one or more signals from a computer over one or more networks. The input module 105 may accept inputs regarding, for example, the total number of unique identifiers requested by the requestor 103, and/or other information such as information that may remain the same and be associated with one or more of the unique identifiers. For example, the requestor 103 may input data associated with a vendor identifier, and the vendor identifier may be associated with the unique identifier and converted into a mark field.

The input device may communicate with the input module 105 via a dedicated connection or any other type of connection. For example, and without limitation, the input device may be in communication with the input module 105 via a Universal Serial Bus ("USB") connection, via a serial or parallel connection to the input module 105, or via an optical or radio link to the input module 105. Any communications protocol may be used to communicate between the input device and the input module 105. For example, and without limitation, a USB protocol or a Bluetooth protocol may be used.

The network may include one or more of: a local area network, a wide area network, a radio network such as a radio network using an IEEE 802.11x communications protocol, a cable network, a fiber network or other optical network, a token ring network, or any other kind of packet-switched network may be used. The network may include the Internet, or may include any other type of public or private network. The use of the term "network" does not limit the network to a single style or type of network, or imply that one network is used. A combination of networks of any communications protocol or type may be used. For example, two or more packet-switched networks may be used, or a packet-switched network may be in communication with a radio network.

The database module 113 may interact with one or more databases 111. The database module 113 may communicate with a database 111 to request information, or to send information to be organized in the database 111. In one embodiment, the database module 113 may interact with a plurality of databases 111. The plurality of databases 111 may be associated with different types of data. For example, and without limitation, one or more databases 111 may be associated with a particular product, or a particular manufacturer. The database module 113 may be operable to interact with one or more databases 111 at the same time, and may be operable to retrieve or send data to each of the one or more databases 111.

The database 111 may store one or more pieces of data associated with unique identifiers, or may store other data related to the unique identifiers. For example, the database 111 may store information regarding manufacturer identification numbers, or part identification numbers. The data may be organized in the database 111 in any way that allows access to the data. For example, and without limitation, the database 111 may be organized as a relational database 111, and may use relational database 111 management system software. In another embodiment, the database 111 may be organized as a flat file, a spreadsheet, or any other type of data organization schema. The database 111 may be stored on one or more systems that are associated with the encoding system, or the database 111 may be stored on the encoding system. The database 111 and the encoding system may be in communication, for example and without limitation, via one or more networks. For example, the database 111 may be stored on the encoding system and be controlled by one or more processes executed on the encoding system, and the database module 113 may interface with the one or more processes to store and retrieve data in the database 111.

The encryption module 115 may receive an input and may encrypt the input. The input may be in the form of data. For example, and without limitation, the input may be a string of alphanumeric characters. The encrypted input may then be communicated to another module within the encoding system, or may be communicated to a system associated with the encoding system. The encryption module 115 may use any method for encrypting data to encrypt the input. For example, the encryption module 115 may present a choice between, for example and without limitation, a block encryption using one or more implementations of the Advanced Encryption Standard ("AES") and/or a stream encryption. In one embodiment, more than one encryption method is used to encrypt the input. The encryption module 115 may encrypt the data using one or more keys. Each key may be substantially unique, so that each time the encryption module 115 receives an input, it may encrypt the input with a different key, or one key may be used to encrypt more than one input. For example, and without limitation, a key may be used to encrypt inputs that correspond to a particular manufacturer, or a particular manufactured item. The keys may be transmitted to the database 111 to be associated with the input that the keys encrypt, or a particular key may have a unique identifier in the database 111, and the encryption module 115 may transmit the unique identifier of the key used to encrypt an input. The encryption module 115 may also transmit the encryption method or methods to the database 111, to be associated with the input.

The error correction module 117 may receive an input, and may generate an output containing one or more error correcting elements. The error correcting elements in the output may be used so that if a portion of the output is destroyed or lost, the input may still be able to be retrieved based at least in part on the remainder of the output and the remainder of the error correcting elements. In one embodiment, the error correcting code may be generated by an implementation of one or more algorithms to receive an input, and generate Reed-Solomon codes based, at least in part, on the input. The implementation may be in either hardware or software, or a combination of hardware and software. In one embodiment, the error correction module 117 may receive an encrypted input from the encryption module 115, and may apply the error correcting code to the encrypted input.

The symbology conversion module 119 may receive an input, and may generate a field of one or more marks in one or more orientations based at least in part on the input. In one embodiment, the symbology conversion module 119 may generate a field of marks that include data marks and location marks. The data marks and the location marks may be the same symbol in differing orientations, or may be different symbols. The marks that the symbology conversion module 119 uses may be located in the database 111, or may be located in another system. The symbology conversion module 119 may use different marks for different applications. For example, and without limitation, the symbology conversion module 119 may use one mark or one set of marks for each given manufacturer listed in the database 111. The symbology conversion module 119 may also use other marks that may be supplied from an external source.

In one embodiment, the symbology conversion module 119 may receive the symbols to use for the encoding process from the database 111, or may request the symbols to use for the encoding process from the database 111. The symbology conversion module 119, or another module, may transmit, for example and without limitation, the unique identifier, or other data, to the database 111. The database 111 may transmit one or more symbols to use for the symbology to the symbology conversion module 119.

The marks in a field may include data symbols and location symbols. In one embodiment, the data symbols and the location symbols are the same symbol rotated in different orientations. Turning now to FIG. 8, there is depicted an exemplary selection of data marks according to an embodiment of the present disclosure. A symbol according to the example shown in FIG. 8 is depicted by two lines intersecting at an approximately fifty degree angle. Other intersection angles may be used, including a ninety degree and a forty-five degree angle. FIG. 8 depicts four orientations of a data mark. In relation to an exemplary orientation line 801, the first data mark 803 is oriented at zero degrees clockwise, the second data mark 805 is oriented at ninety degrees clockwise, the third data mark 807 is oriented at one hundred eighty degrees clockwise, and the fourth data mark 809 is oriented at two hundred seventy degrees clockwise. Four different data marks are shown as different orientations of a single mark, corresponding to four different values that the mark may represent as a data mark. In one embodiment, more orientations of a single mark may be used to correspond to additional values that the mark may represent. For example, the single mark depicted in FIG. 8 may be oriented in 45 degree increments, yielding eight positions instead of the four depicted in FIG. 8. Additional orientations are possible, depending on the sensitivity of the image output device 109 and/or the image input device 203, or the size requirements or space requirements of the encoded field. In one embodiment, additional marks may be used in place of a specifically oriented mark. For example, in the embodiment shown in FIG. 8, the letters "A," "B," "C," and "D" may be used as marks, and the orientation of the letters may not be considered to encode additional data. In one embodiment, both additional marks and orientation information may be used to represent data values. For example, the letters "A," "B," "C," and "D" may be used as marks, and each of the letters may be oriented in four positions as depicted in FIG. 8. For four different marks presented, and four different orientations, a total of sixteen data values may be represented by a single mark in a specific orientation.

Turning now to FIG. 9, there is depicted an exemplary selection of location marks according to an embodiment of the present disclosure. A symbol according to the example shown in FIG. 8 is depicted by two lines intersecting at an approximately fifty degree angle. Of course, other intersection angles may be used, including a ninety degree and a forty-five degree angle. FIG. 9 depicts four orientations of a single location mark. In relation to an exemplary orientation line 901, the first data mark 903 is oriented at forty-five degrees clockwise, the second data mark 905 is oriented at one hundred thirty-five degrees clockwise, the third data mark 907 is oriented at two hundred twenty-five degrees clockwise, and the fourth data mark 909 is oriented at three hundred fifteen degrees clockwise. As shown above with respect to the data marks, additional locations marks may be provided, as well as additional orientations of the same or different location marks.

Shown in FIGS. 8 and 9, the data marks and the location marks may be the same mark oriented to different angles. The data marks of FIG. 8 may be oriented at right angles with respect to orientation line 801, and the location marks of FIG. 9 may be oriented at 45 degree angles with respect to orientation line 901.

Figure 6:
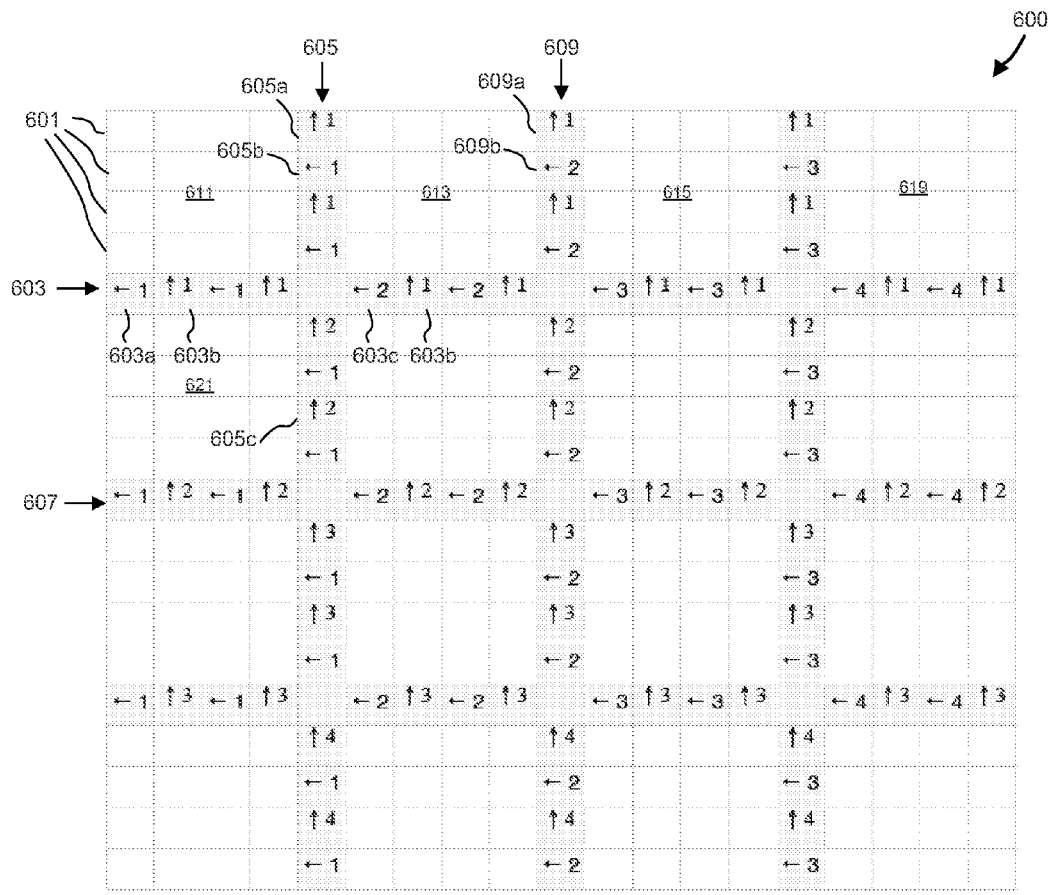
FIG. 6 is an exemplary field identification scheme according to an embodiment of the present disclosure

A field may include one or more marks arranged in an order to represent data values. The field may be a fixed number of marks arranged in a pattern. For example, and as shown in FIG. 6, the field may be a number of marks arranged in a square array of nineteen marks across and nineteen marks down. Other amounts of marks, in other orientations and patterns, may also be used. The size and shape of the field may be changed according to the medium that the field may be affixed to, or the amount of data that is required for a task. For example, if a task requires only that a small amount of data be encoded into a field, then the field may be smaller. If a task requires that a large amount of data be encoded into a field, or if a particular application may use additional error correction, then the number of marks to encode the field may increase, and the field may be larger.

The field may be divided into sections of data marks, exemplary sections of which are shown as elements 611, 613, 615, 619, and 621 in FIG. 6, and sections of location marks, exemplary sections of which are shown as elements 603, 605, 607, and 609. The data marks may encode data information, and the location marks may encode position within the field of marks.

The location marks may be arranged so that one or more location marks may identify the relative position of the location marks, and also the marks surrounding the location marks. A representation of the position of location marks is shown in FIG. 6. Data mark subfield 611 is, for example, bounded by a row of location marks 603, and a column of location marks 605. The row of location marks alternates between noting a row location identifier, depicted by identifier 603b, and a column location identifier, depicted by identifier 603a. The row of location marks 603, for example, indicates that the row of location marks 603 is the first row of location marks in the field, indicated by row identifier 603b. The row of location marks 603 bounding data mark subsection 611 also indicates, for example, that it bounds the first column of data marks in the field, indicated by column identifier 603a.

Similarly, the column of location marks 605 alternates between noting a column location identifier, depicted by identifier 605b, and a row location identifier, depicted by identifier 605a. The column of location marks 605, for example, indicates that the column of location marks 605 is the first row of location marks in the field, indicated by row identifier 605b. The column of location marks 605 bounding data mark subsection 611 also indicates, for example, that the column of location marks 605 bounds the first row of data marks in the field, indicated by column identifier 605a.

Similarly, data mark subfield 613 is bounded by a row of location marks 603, and a column of location marks 609. The row location identifier 603b that bounds the data mark subsection 613 may be the same as the row location identifier 603b that bounds the data mark subsection 611, to indicate that the row of location marks 603 is the same row bounding both data subsections 611 and 613. The column of location marks 609 alternates between noting a column location identifier, depicted by 609b, and a row location identifier, depicted by identifier 609a. The column of location marks 609, for example, indicates that the column of location marks 609 is the second column of location marks in the field, indicated by row location identifier 609b. The column of location marks 609 bounding data mark subsection 613 also indicates, for example, that the column of location marks 609 bounds the second row of data marks in the field, indicated by column identifier 609a.

Figure 7:
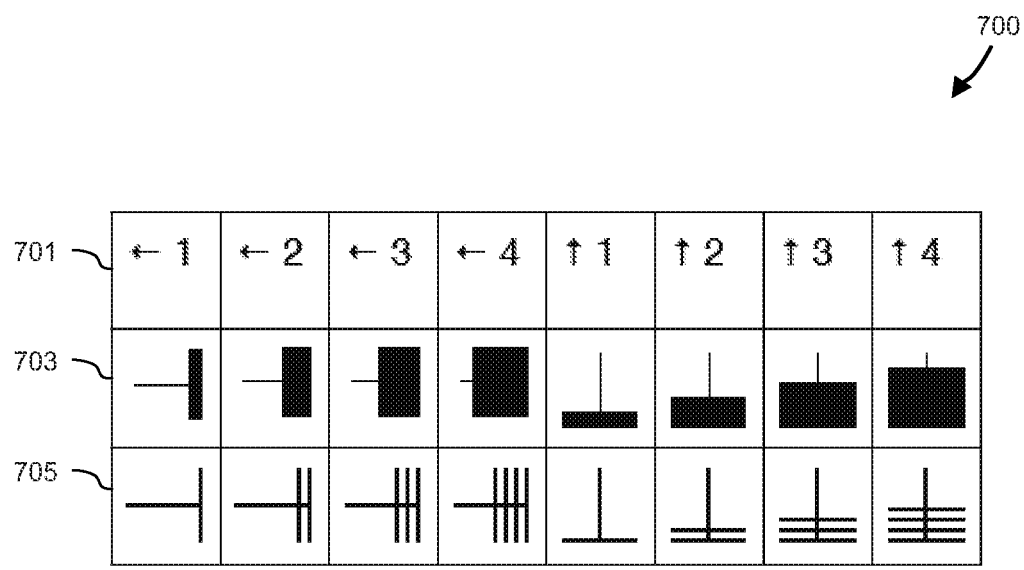
FIG. 7 is an exemplary selection of field row and column identifier marks according to an embodiment of the present disclosure.

Turning now to FIG. 7, there is shown an exemplary selection of field row and column identifier marks according to an embodiment of the present disclosure. The row of generic identifiers depicted in 701 may be the same identifiers shown in the location rows and location columns of FIG. 6. That is, the first four columns of row 701 may identify the column location identifiers shown in the location rows and the location columns of FIG. 6. The fifth through eighth columns of row 701 may identify the row location identifiers shown in the location rows and the location columns of FIG. 6. Exemplary row location identifiers and column location identifiers are shown in rows 703 and 705. In row 703, the column location identifiers may comprise a horizontal line intersecting a vertical line. The thickness of the vertical line may indicate positional data. For example, a relatively thin vertical line may indicate that the column location identifier is the first column location identifier in the field, and a relatively thicker vertical line may indicate that the column location identifier is the last column location identifier in the field. In row 703, the row location identifiers may comprise a vertical line intersecting a horizontal line. The thickness of the horizontal line may indicate positional data. For example, a relatively thin horizontal line may indicate that the row location identifier is the first row location identifier in the field, and a relatively thicker horizontal line may indicate that the row location identifier is the last row location identifier in the field.

In another embodiment, and as shown in row 705 of FIG. 7, frequency of lines may also convey positional information. In row 703, the column location identifiers may comprise a horizontal line intersecting one or more vertical lines, all of approximately the same thickness. The number of vertical lines may indicate positional data. For example, one vertical line may indicate that the column location identifier is the first column location identifier in the field, and four vertical lines may indicate that the column location identifier is the last column location identifier in the field. In row 703, the row location identifiers may comprise a vertical line intersecting one or more horizontal lines, all of approximately the same thickness. The number of horizontal lines may indicate positional data. For example, one horizontal line may indicate that the row location identifier is the first row location identifier in the field, and four horizontal lines may indicate that the row location identifier is the last row location identifier in the field.

Rows 703 and 705 of FIG. 7 are intended to be exemplary only. In one embodiment, the row location identifiers and the section location identifiers may be mixed, so that, for example, the row location identifiers of row 703 and the section location identifiers of row 705 may be used. Additionally, other marks or styles may be used. For example, and without limitation, a single mark with four orientations may be used to represent four different location information data points. Two marks, each with four orientations, may be used to convey information associated with the row and section location identifiers.

The output module 107 may receive an input, and may be in communication with the image output device 109 to present the one or more symbols. In one embodiment, the output module 107 may receive the one or more symbols from the symbology conversion module 119, and may transmit the one or more symbols to the image output device 109. The output module 107 and the image output device 109 may be in communication with one another. For example, and without limitation, the output module 107 and the image output device 109 may be in communication via a network, or may be in communication via a dedicated connection, such as a cable or radio link.

The image output device 109 may create a representation of the field. For example, and without limitation, the image output device 109 may create a representation of the field in a physical form. In one embodiment, the image output device 109 may include one or more lasers and a device to position the lasers. The image output device 109 may direct the beam of the laser onto a surface, and ablate or etch a representation of the field onto the surface. In one embodiment, the image output device 109 may include a printer. The printer may print a representation of the field onto a medium or substrate, such as a piece of paper or a material with an adhesive backing (e.g., a sticker).

Figure 2:
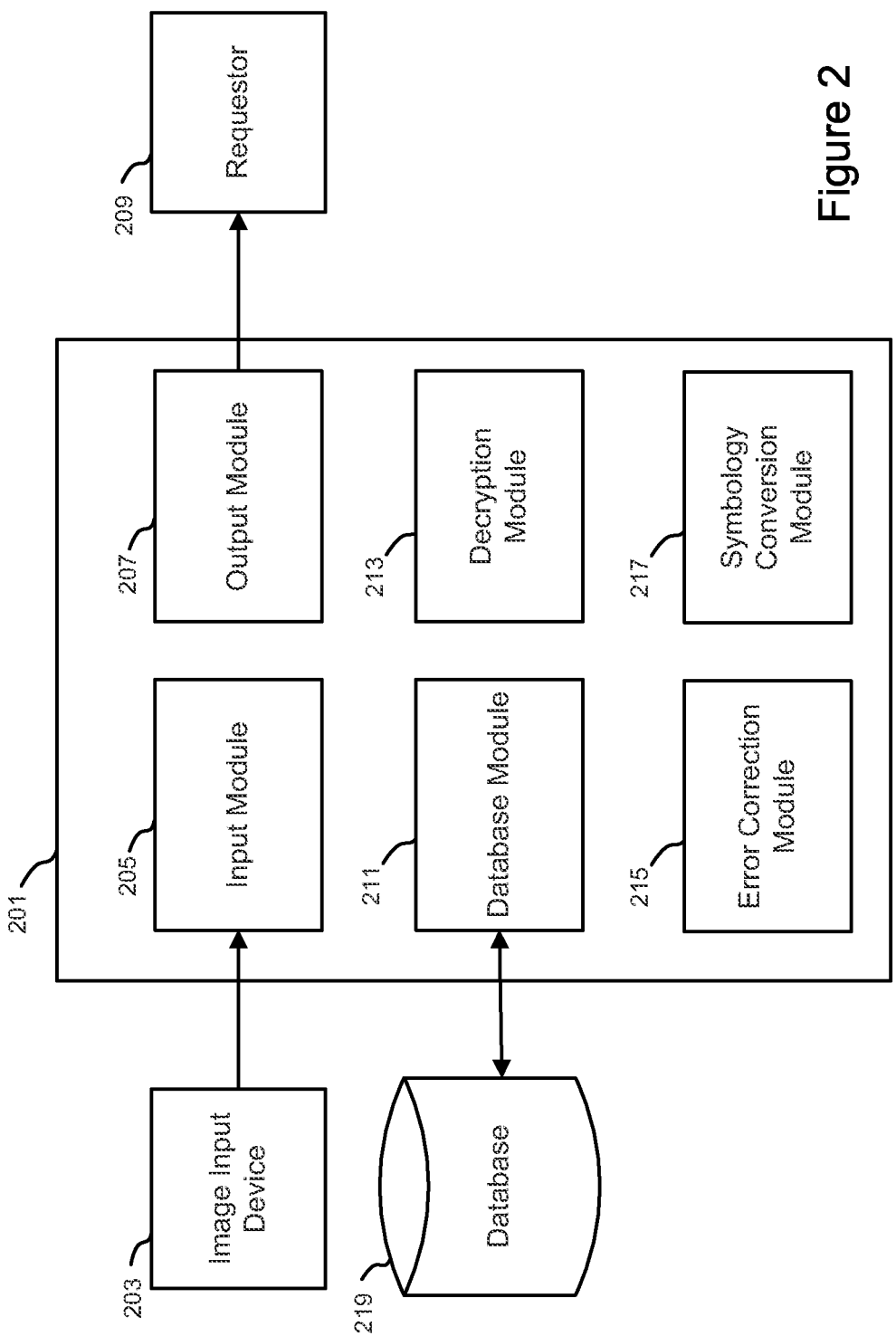
FIG. 2 is a component view of an exemplary decoding system according to an embodiment of the present disclosure.

Turning now to FIG. 2, a component view of an exemplary decoding system 201 according to an embodiment of the present disclosure is shown.

The decoding system 201 may include an input module 205, a database module 211, a decryption module 213, an error correction module 215, a symbology conversion module 217, and an output module 207. The decoding system 201 may be a single system, or may be two or more systems in communication with each other. The decoding system 201 may include one or more input devices, one or more output devices, one or more processors, and memory associated with the one or more processors. The memory associated with the one or more processors may include, but is not limited to, memory associated with the execution of the modules, and memory associated with the storage of data. The decoding system 201 may also be associated with one or more networks, and may communicate with one or more additional systems via the one or more networks. The modules may be implemented in hardware or software, or a combination of hardware and software. The decoding system 201 may also include additional hardware and/or software to allow the decoding system 201 to access the input devices, the output devices, the processors, the memory, and the modules. The modules, or a combination of the modules, may be associated with a different processor and/or memory, for example on distinct systems, and the systems may be located separately from one another. In one embodiment, the modules may be executed on the same system as one or more processes or services. The modules may be operable to communicate with one another and to share information. Although the modules are described as separate and distinct from one another, the functions of two or more modules may instead be executed in the same process, or in the same system.

The input module 205 may be in communication with an image input device 203. The input module 205 may be operable to receive signals from the image input device 203 and to transmit the signals to other modules in the decoding system 201. The input module 205 may receive the image from the image input device 203, and may apply one or more transformations to the image to allow the image to be analyzed. For example, and without limitation, the input module 205 may resize, rotate, deskew, flatten, or otherwise process or clarify the image to allow the image to be further processed.

The image input device 203 may be operable to receive a field and to convert the field into signals that may be communicated to the input module 205. For example, and without limitation, the image input device 203 may be a charge-coupled device ("CCD") in a video capture device, a digital camera, or a scanner. The CCD device may, for example, record or otherwise capture a video. The field may pass in front of the CCD, and one or more images of the field may be captured by the video capture device. The CCD device may also be mounted in a still-frame camera. The still-frame camera may be operable to, for example and without limitation, capture images on a timed scale (e.g., every second or every minute) or to capture images based on a trigger (e.g., if an object breaks a beam of light). The image input device 203 may also be a scanner. For example, and without limitation, the field may be placed on the scanner, and the scanner may capture a representation of the field. The representation may be transmitted to the input module 205.

The database module 211 may interact with one or more databases 219. The database module 211 may communicate with a database 219 to request information, or to send information to be organized in the database 219. In one embodiment, the database module 211 may interact with a plurality of databases 219. The plurality of databases 219 may be associated with different types of data. For example, and without limitation, one or more databases 219 may be associated with a particular product, or a particular manufacturer. The database module 211 may be operable to interact with one or more databases 219 at the same time, and may be operable to retrieve or send data to each of the one or more databases 219.

The database 219 may store one or more pieces of data associated with unique identifiers, or may store other data related to the unique identifiers. For example, the database 219 may store information regarding manufacturer identification numbers, or part identification numbers. The data may be organized in the database 219 in any way that allows access to the data. For example, and without limitation, the database 219 may be organized as a relational database 219, and may use relational database 219 management system software. In another embodiment, the database 219 may be organized as a flat file, a spreadsheet, or any other type of data organization schema. The database 219 may be stored on one or more systems that are associated with the decoding system 201, or the database 219 may be stored on the decoding system 201. The database 219 and the decoding system 201 may be in communication, for example and without limitation, via one or more networks. For example, the database 219 may be stored on the decoding system 201 and be controlled by one or more processes executed on the decoding system 201, and the database module 211 may interface with the one or more processes to store and retrieve data in the database 219.

The symbology conversion module 217 may be operable to receive an input from, for example and without limitation, the input module 205, and to decipher the field of marks represented in the field. The symbology conversion module 217 may use character recognition methods to identify information regarding the one or more marks in the field. The information may include, for example and without limitation, the size, type, style, position, orientation, and/or number of the marks in the field. The information of the marks may convey data. The symbology conversion module 217 may assign data values to the information received from the field of marks. For example, and without limitation, the symbology conversion module 217 may assign a value to a mark in a certain orientation. The symbology conversion module 217 may assign a value of "A" to a mark having a zero degree orientation, and a value of "B" to a mark having a ninety degree orientation. The symbology conversion module 217 may assign other values to remaining marks in the field, or remaining mark orientations in the field. The symbology conversion module 217 may produce as an output a string of one or more alphanumeric characters representative of the information encoded by the marks in the field.

The decryption module 213 may receive an input and may decrypt the input to create a decrypted output. The input may be in the form of data. For example, and without limitation, the input may be a string of alphanumeric characters. The encrypted input may then be communicated to another module within the decoding system 201, or may be communicated to a system associated with the decoding system 201. The decryption module 213 may use any method for decrypting data to decrypt the input. For example, the decryption may use a complementary method as was used to encrypt the input at the encryption system. In one embodiment, more than one decryption method is used to decrypt the input. The decryption module 213 may decrypt the data using one or more keys. Each key may be substantially unique, so that each time the decryption module 213 receives an input, it may decrypt the input with a different key, or one key may be used to decrypt more than one input. For example, and without limitation, a key may be used to decrypt inputs that correspond to a particular manufacturer, or a particular manufactured item. The keys may be transmitted to the database 219 to be associated with the input that the keys encrypt, or a particular key may have a unique identifier in the database 219, and the decryption module 213 may transmit the unique identifier of the key used to decrypt the input. The decryption module 213 may also transmit the decryption method or methods to the database 219, to be associated with the input.

The error correction module 215 may receive an input with one or more error correcting elements, and may generate an output containing data. In one embodiment, the error correcting code may be generated by an implementation of one or more algorithms to receive an input, and generate Reed-Solomon codes based, at least in part, on the input. The implementation may be in either hardware or software, or a combination of hardware and software.

The output module 207 may receive an input and generate an output to be communicated to a requestor 209 or a requestor system. The output module 207 may, for example and without limitation, receive the input and communicate the input to the database 219. The input may be, but is not limited to, the data received from the mark field, converted into data by the symbology conversion module 217, decoded by the error correction module 215, and decrypted by the decryption module 213. The output module 207 may communicate the data to the database 219 to query if the data is present within the database 219. If the data is present within the database 219, the field may represent data that was encoded by the encoding system. If the data is not present within the database 219, the field may represent data that was not encoded by the encoding system. The field, and therefore the item that the field was affixed to, may, for example and without limitation, be counterfeit, or the amount of the field recovered by the image capture device may not be sufficient to yield accurate data. In one embodiment, a decoding system 201 may be positioned near an encoding system, and may attempt to decode the fields of marks that the encoding system produces, to ensure that the encoding system is operating properly and that the data encoded in the field of marks may be properly decoded and processed.

Figure 3:
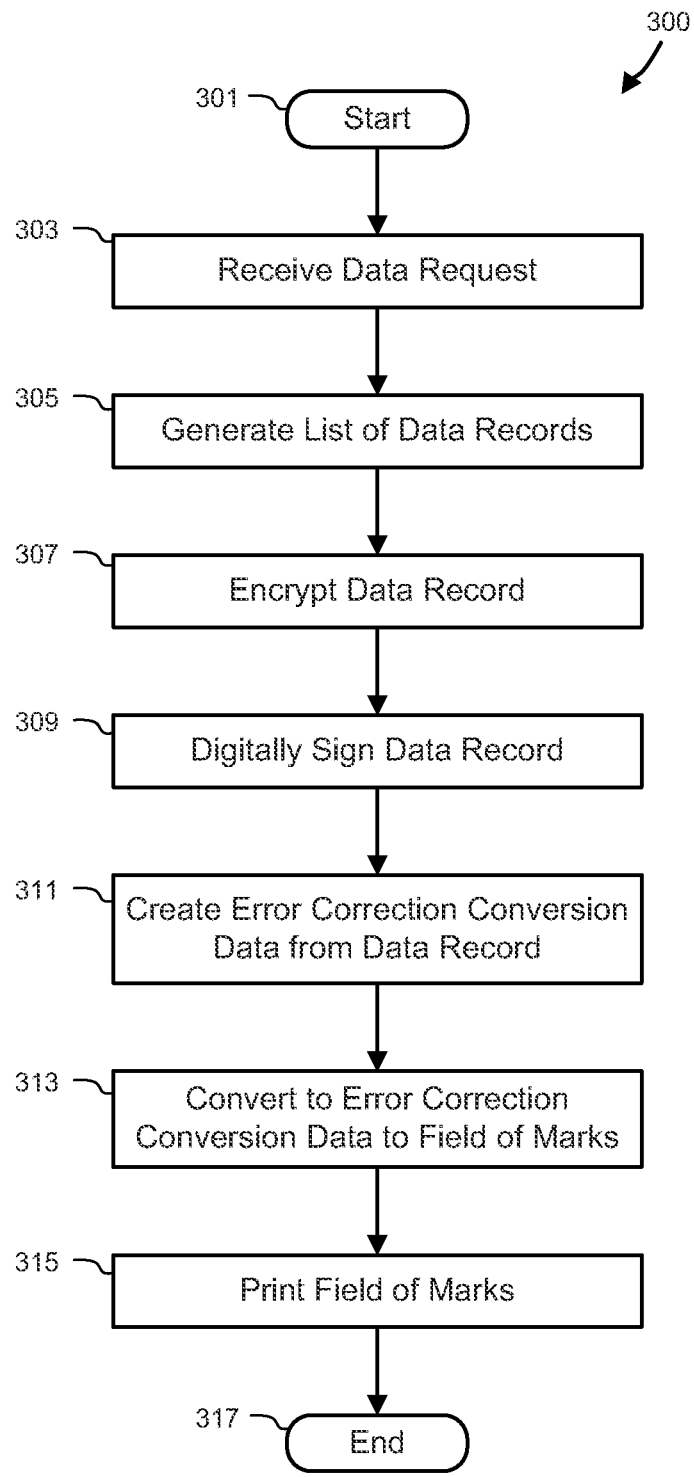
FIG. 3 is a flow chart to encode data to symbology according to an embodiment of the present disclosure.

Turning now to FIG. 3, a flow chart 300 to encode data to symbology is shown according to an embodiment of the present disclosure. The method may begin as represented in step 301. As represented in step 303, the encoding system 101 may receive a request to encode data. The request may be, for example and without limitation, a request for a number of unique identifiers with one or more additional data codes. For example, a manufacturer may desire to create records for a number of individual parts, all of a certain type. The manufacturer may request data records for each of the number of individual parts. The encoding system 101, the database module 113, and the database 111 may generate records containing a unique identifier, the manufacturer's unique code, and the part's unique code. The database 111 may store the unique identifiers and associate the unique identifiers with the part's unique code and the manufacturer's unique code.

As represented in step 305, the encoding system 101 may receive the request for data, and may generate the data records associated with the data request. The data records may be stored in the database 111 and may be communicated to the encoding system 101 via the database module 113 or the input module 105. In one embodiment, the data records may be transmitted to the database 219 for the decoding system 201, or the database 111 for the encoding system 101 and the database 219 for the decoding system 201 may be the same database, or copies of the same database.

As represented in step 307, the data records may be encrypted. The data records may be encrypted by the encryption module 115. The encryption module 115 may use any encryption method to encrypt the data records, and may use more than one encryption method to encrypt the data records. As represented in step 309, the encryption module 115 may also digitally sign the encrypted data records. The key or keys used to digitally sign the encrypted data records may be generated for each data record, or the key or keys may be used by the encoding system 101 to digitally sign some or all of the data records.

As represented in step 311, the error correction module 117 may receive the encrypted and signed data records, and may add one or more error correcting codes to the encrypted and signed data records. The error correction module 117 may use any error correcting algorithms to add the error correcting codes. The addition of the error correcting codes may allow the data to be extracted if a portion of the code has been obliterated. More or fewer error correcting codes, or additional redundancy, may be added to the encrypted and signed data records depending on the anticipated wear of the field of marks. For example, where heavy wear is anticipated and much or most of the field of marks is expected to be obliterated, additional error correction and/or redundancy may be added to the encrypted and signed data records. Where light wear or no wear is expected, less error correction and/or redundancy may be added to the encrypted and signed data records.

As represented in step 313, the symbology conversion module 119 may convert the data with the error correction codes from the error correction module 117 and may generate a field of marks to represent the data with the error correction codes. The symbology conversion module 119 may use marks of different types, or a single mark of different orientations, or other combinations of size, shape, type, or orientation of mark to encode the data with the error correction codes. The symbology conversion module 119 may also add additional error correction. For example, the symbology conversion module 119 may add row location identifiers and column location identifiers to location rows and location columns. The addition of the location rows and the location columns may allow the decoding system 201 to location the position and orientation of marks with a portion of the field of marks destroyed or obliterated.

As represented in step 315, the output module 107 may communicate the field of marks to the image output device 109. The image output device 109 may affix the field of marks to an item or to another physical object. In one embodiment, the image output device 109 may etch a field of marks to a physical item. In one embodiment, the image output device 109 may print a field of marks to a medium, for example a sticker, a piece of paper, or a slide. The output module 107 may communicate to the encoding system 101 that the field of marks representing a particular data record has been printed or etched, and the database 111 may record that the data record has been created. The method may then end, as represented in step 317.

While the method 300 is represented as a series of steps, the steps may be performed in any order. For example, the encoding system 101 may sign the data records, as represented in step 309 before encrypting the data records, as represented in step 307. Additionally, the encoding system 101 may create the error correcting codes, as represented in step 311, before either encrypting the data records, as represented in step 307, or signing the data records, as represented in step 309.

Figure 4:
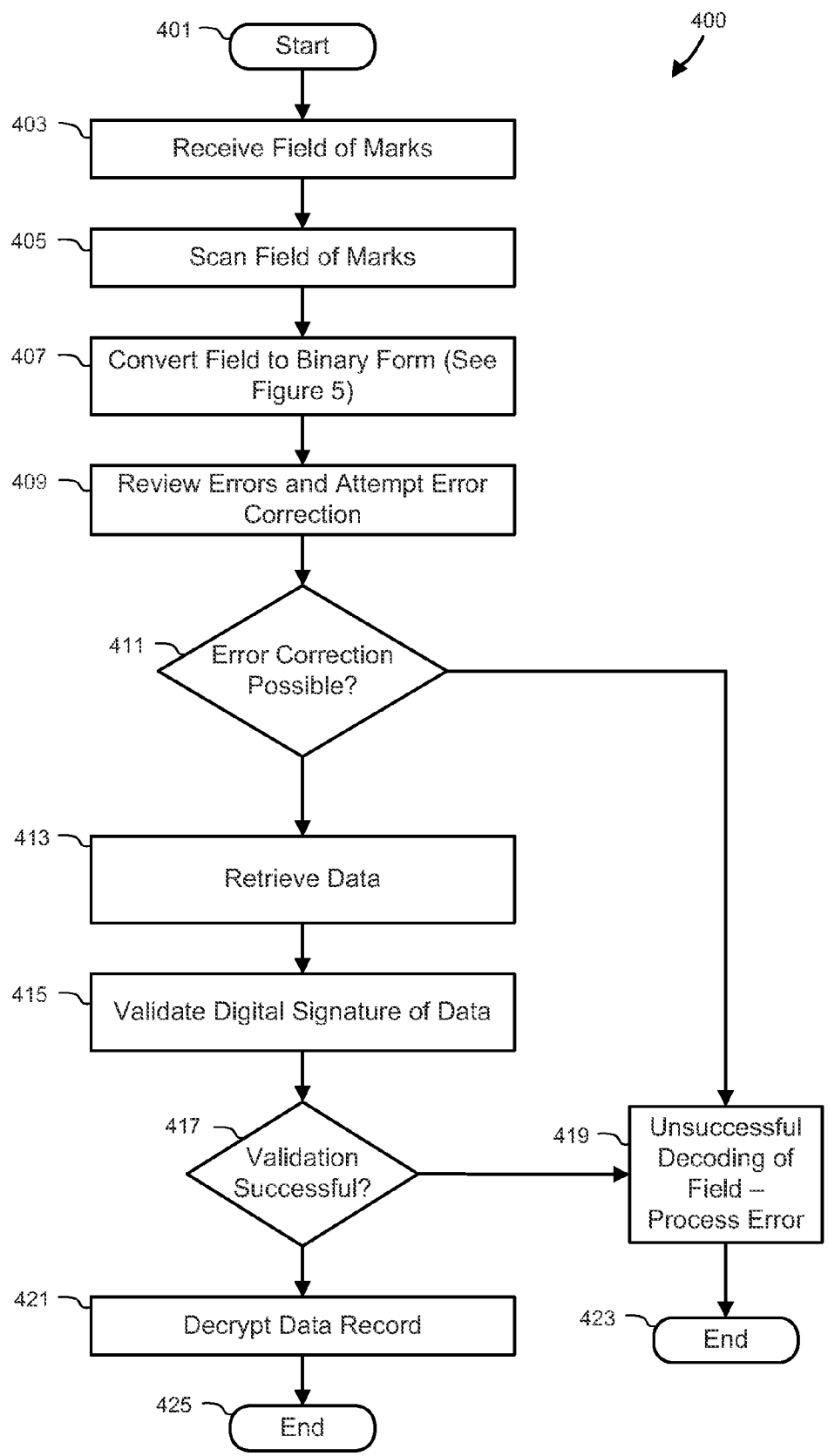
FIG. 4 is a flow chart to decode symbology to data according to an embodiment of the present disclosure.

Turning now to FIG. 4, a flow chart 400 to decode symbology to data is shown according to an embodiment of the present disclosure. The method may begin as represented in step 401. As represented in step 403, the decoding system 201 may receive a field of marks. The field may be etched or otherwise affixed to an item, or the field may be provided and otherwise associated with an item (e.g., printed on a packing slip or on a box containing the item or items).

As represented in step 405, the field of marks may be input into the decoding system 201. For example, and without limitation, the field of marks may be imaged using a video camera or a still camera, either film-based or digital, or an article may be scanned using a scanner. Other methods of reading a mark into a system may also be used. For example, the field of marks may be drawn into a system, or the field of marks may be typed into the system or input into the system in another way. The scan of the field of marks may yield an image.

Figure 5:
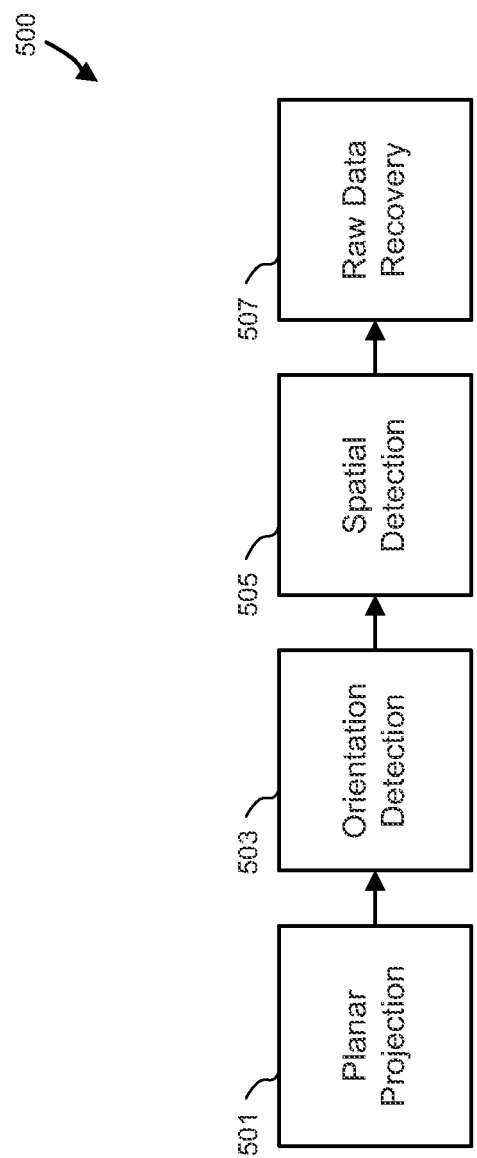
FIG. 5 is a flow chart to decode symbology to data according to an embodiment of the present disclosure.

As represented in step 407, and shown also with reference to FIG. 5, the image may be processed to allow the decoding system 201 to convert the field of marks into representative data. Turning now to FIG. 5, a flow chart 500 to decode symbology to data is shown according to an embodiment of the present disclosure. As represented in step 501, the image may be subjected to planar projection, where a three dimensional image, such as from a video camera or a still camera, may be the image may be mapped to points on a two dimensional plane. The image may be subjected to planar projection so that the marks present in the image may be detected and analyzed by the decoding system 201.

As represented in step 503, the image may be processed to find its orientation. The field of marks may be imaged in any orientation, and the decoding system 201 may use one or more algorithms to determine the field's orientation in the image. The image may be rotated so that the field is in substantially a specific orientation, so that the marks present in the image may be detected and decoded. Orientation may be discovered by the decoding system 201 by, for example and without limitation, the row identifiers and/or column identifiers that may be present in the row location identifiers and the column location identifiers present in rows and/or columns of location marks present within the field of marks. If no field if marks can be found, the decoding system 201 may send an error reporting that fact, or may wait for another image to analyze.

As represented in step 505, the image may be processed to determine spatial detection. Spatial detection may include, for example and without limitation, the relative size of the field of marks in the image, or the relative position of the field of marks in the image. The size and position of the field of marks may be adjusted to allow for more efficient processing of the image. For example, and without limitation, the field of marks may be centered in the image, and the field of marks may be resized to a specific size. Spatial detection and image resizing may occur to counter the effects of differing equipment that may be used to print the field of marks and the equipment that may read the field of marks. If an image contains a field of marks that is in an acceptable position and size, repositioning and/or resizing of the field of marks in the image may not be desired.

As represented in step 507, an image that has been processed may be analyzed to determine the orientation and position of the marks in the field of marks. The orientation of each of the marks in the field of marks may be noted, and one or more data values may be associated with each orientation and type of mark in the field of marks. The location rows and the location columns may also be noted, and the data in the row location identifiers and the column location identifiers may also be noted. Raw data, indicating the position and orientation of the marks, may be recovered from the image.

Figure 10:
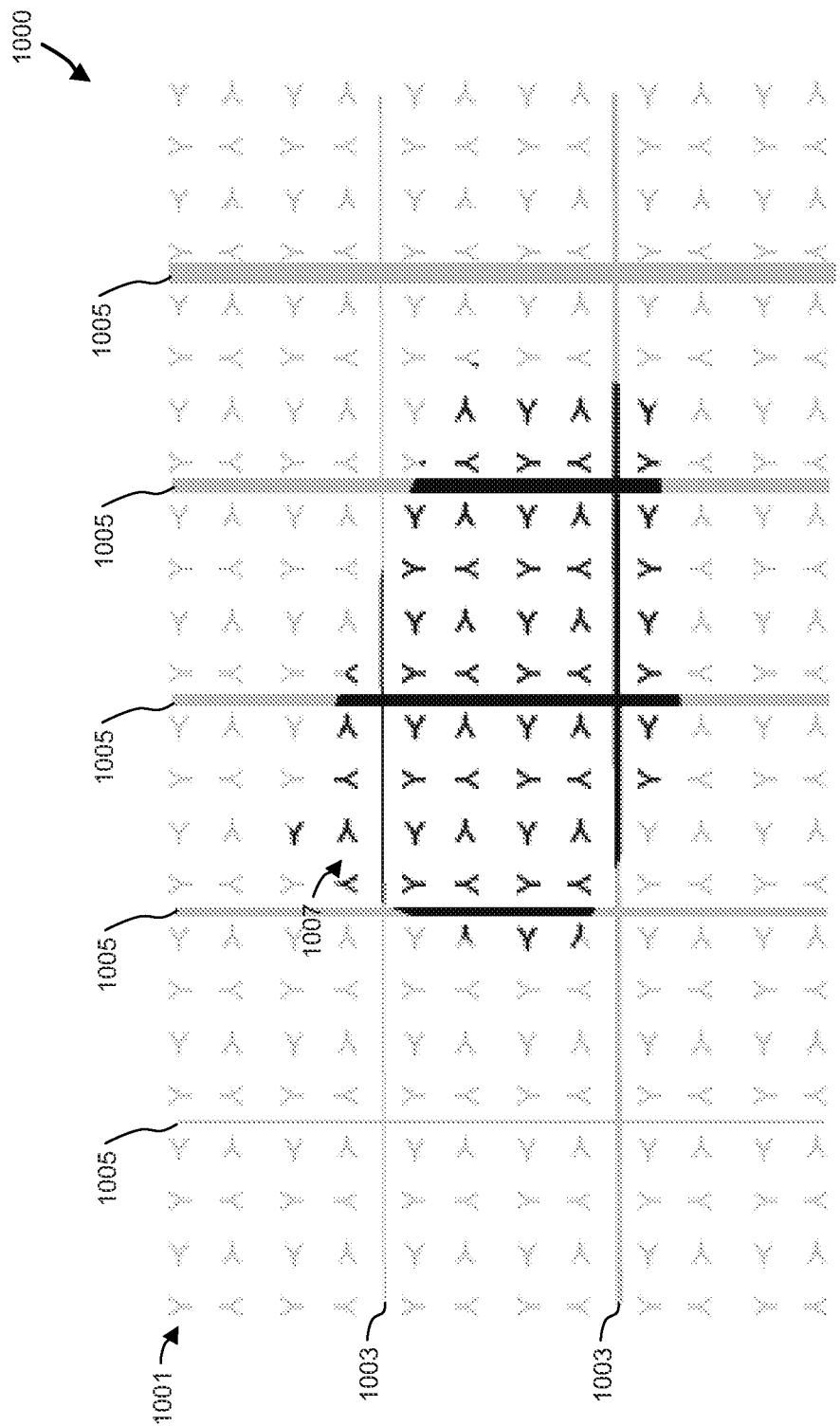
FIG. 10 is an exemplary field of data marks with an obliterated portion according to an embodiment of the present disclosure.

If any of the field of marks has been obliterated, the decoding system 201 may note the points that have been obliterated. The decoding system 201 may decode the location rows and the location columns to determine the position of the obliterated data marks. In one embodiment, eighty percent of the field of marks may be obliterated, and the data encoded in the field of marks may be able to be completely decoded with the remaining twenty percent of the field of marks, if the twenty percent forms a continuous portion of the field of marks (i.e., is not in two or more unconnected sections). A representation of a field of marks, with a section of the field of marks obliterated, is shown in FIG. 10. Turning now to FIG. 10, there is shown an exemplary field 1000 of data marks with an obliterated portion according to an embodiment of the present disclosure. The field 1000 may include location columns 1005 and location rows 1003. The location columns 1005 may be represented by vertical lines that increase in thickness from left to right across the field. The location rows 1003 may be represented by vertical lines that increase in thickness from top to bottom across the field. The darker portion 1007 of the field of marks may be visible, and the remainder of the field 1000 may be obliterated or otherwise unreadable. The detection features represented in steps 501, 503, and 505 may resize and reorient the field 1000 so that the field is able to be analyzed. For example, the decoding system 201 may find that, based on the relative thickness of the location columns 1005, that the marks visible in the remaining portion of the field may be in a proper orientation, that is, right-to-left in the field. The decoding system 201 may also analyze the location rows 1003 remaining in the visible portion of the field 1000, and may also find that, based on the relative thickness of the location rows 1003, that the marks visible in the remaining portion of the field may be in the proper orientation. The decoding system 201 may also analyze the location columns and the location rows and may determine, for example and without limitation, that the location rows and the location columns indicate that the visible portion of the field of marks comprises portions of the first, second, and third rows of marks, and portions of the second, third, fourth, and fifth columns of marks. The decoding system 201 may use this information to determine the position of the marks in the visible portion of the field of marks. Based on the information, the decoding system 201 may determine that enough marks remain to properly decode the message.

The activities represented in steps 501, 503, and 505 may be performed in any order, and may also be performed in any order with respect to the steps depicted in FIG. 4.

As represented in step 409, the decoding system 201 may receive the raw data from the module or modules for image processing (not shown), and the error correction module 215 may use the values from the raw data to retrieve the data encoded in the field of marks. As represented in step 411, if the data may be retrieved from the field of marks, the method may continue to step 413. If the data cannot be retrieved from the field of marks, because, for example, a portion of the field of marks has been obliterated or may not have been scanned, the decoding system 201 may process and transmit an error condition, as represented in step 419. The error condition may include an error message, or the decoding system 201 may send an error message to another system. The method may end as represented in step 423.

As represented in step 415, if data can be retrieved from the field of marks, the decryption module 213 may attempt to validate the signature of the data, if the data has been signed by the encoding system 101. The signature may be transmitted from the encoding system 101 to the decoding system 201, or the decoding system 201 may have a key that may be used to verify the signature of the data. As represented in step 417, if the validation of the digital signature is successful, the method may continue to step 421. If the validation of the digital signature is not successful, the decoding system 201 may process and transmit an error condition, as represented in step 419. The error condition may include an error message, or the decoding system 201 may send an error message to another system. The method may end as represented in step 423.

As represented in step 421, if the data has been validated as digitally signed by the encoding system, the data may be decrypted. The data may be decrypted by the decryption module 213. The decryption module 213 may use any decryption method to decrypt the data, and may use more than one decryption method to decrypt the data records. For example, and without limitation, the decryption module 213 may use the same decryption method or methods as the encryption module 115 of the encoding system 101 used to encrypt the data records. The decrypted data records may be compared to the data records generated by the encoding system 101. If the decrypted data record is found in the database 111 in the encoding system 101, then the decoding system 201 may indicate that the data record is valid and authentic. If the decrypted data record is not found in the database 111, then the decoding system 201 may indicate that the data record is not authentic. The decoding system 201 may also use the database 219 associated with the decoding system 201, or may use another database to track data records.

While the method 400 is represented as a series of steps, the steps may be performed in any order. The steps for the decoding system 201, represented in method 400, may be the reverse of the steps for the encoding system 101, represented in method 300, however this is not a requirement. For example, the decoding system 201 may decrypt the data record, as represented in step 421, before validating the digital signature of the data record, as represented in step 415. Additionally, the decoding system 201 may decrypt the data record, as represented in step 421, before attempting error correction, as represented in step 409.

While this disclosure has been described as having exemplary designs, the present disclosure can be further modified within the spirit and scope of this disclosure. This application is therefore intended to cover any variations, uses or adaptations of the disclosure using its general principles. Further, this application is intended to cover such departures from the present disclosure as come within known or customary practice in the art to which this disclosure pertains and which fall within the limits of the appended claims.

What is claimed is:

1. A method of generating an identifier, the method comprising the steps of:
    receiving data;
    creating one or more error correcting codes for the data;
    associating the one or more error correcting codes with the data;
    encrypting the data; and
    generating a field of one or more marks based at least in part on the encrypted data, the field of one or more marks encoding the data and the error correcting codes, wherein the one or more marks includes at least one row location identifier and at least one column location identifier, wherein the at least one row location identifier and the at least one column location identifier are included in the field of one or more marks and wherein the marks are provided in different orientations within the field with each orientation providing a different value for a mark.

2. The method of claim 1, wherein the marks are all of the same shape.

3. The method of claim 1, further comprising signing the data with a signature before generating the field of one or more marks, and generating the field of one or more marks based at least in part on the signed data.

4. The method of claim 1, further comprising printing the field of one or more marks onto a substrate.

5. The method of claim 1, further comprising etching the field of one or more marks onto a substrate.

6. The method of claim 1, wherein the at least one row location identifier is represented by one or more marks, the one or more marks indicating one or more values associated with each of the at least one row location identifier.

7. The method of claim 1, wherein the at least one column location identifier is represented by one or more marks, the one or more marks indicating one or more values associated with each of the at least one column location identifier.

8. The method of claim 1, wherein the error correcting codes associated with the data are one or more Reed-Solomon codes.

9. The method of claim 1 wherein each mark includes two lines that intersect and define an included angle of between 45 and 90 degrees.

10. The method of claim 9 wherein the marks are in the shape of the letter Y.

11. The method of claim 1 wherein at least one of the row location identifier or the column location identifier is the same shape as the data marks.

12. The method of claim 1 wherein at least one of the row location identifier or the column location identifier is represented by one or more lines, and the thickness of said one or more lines or the number of lines used denote a particular value for the row or column location identifier.

13. The method of claim 1 wherein the field includes at least one subfield of data marks bounded by a row of location marks and a column of location marks.

14. The method of claim 13 wherein the row of location marks includes marks noting at least one row location identifier and at least one column location identifier.

15. The method of claim 13 wherein the column of location marks includes marks noting at least one row location identifier and at least one column location identifier.

16. A system for generating an identifier, comprising:
    a database including data for which an identifier is to be generated;
    a module operable to receive data from the database;
    a module operable to generate a data record including the data from the database and an identifier associated with the data from the database;
    a module operable to create one or more error correcting codes for the data record;
    a module to associate the one or more error correcting codes with the data record;
    a module to generate a field of one or more marks, the field of one or more marks encoding the data record and the error correcting codes, wherein the one or more marks includes at least one row location identifier and at least one column location identifier, wherein the at least one row location identifier and the at least one column location identifier are included in the field of one or more marks;
    a module operable to encrypt the data before generating the field of one or more marks so that the field of one or more marks is generated based at least in part on the encrypted data; and
    a module operable to communicate the data record with a module used to decode the field of marks.

17. The system of claim 16, further comprising a module operable to decode the field of marks based at least in part on the at least one row location identifier and the at least one column location identifier and determine a data record from the field.

18. The system of claim 16, further comprising a module operable to sign the data with a signature before generating the field of one or more marks, and generate the field of one or more marks based at least in part on the signed data.

19. The system of claim 16, further comprising a module operable to print the field of one or more marks onto a substrate.

20. The system of claim 16, further comprising a module operable to etch the field of one or more marks onto a substrate.

21. The system of claim 16, wherein the at least one row location identifier is represented by one or more marks, the one or more marks indicating one or more values associated with each of the at least one row location identifier.

22. The method of claim 16, wherein the at least one column location identifier is represented by one or more marks, the one or more marks indicating one or more values associated with each of the at least one column location identifier.

23. The method of claim 16, wherein the error correcting codes associated with the data are one or more Reed-Solomon codes.

24. A method for decoding a field of marks, the method comprising the steps of:
receiving a field of one or more marks, the field of one or more marks encoding data and error correcting codes, wherein the one or more marks includes at least one row location identifier and at least one column location identifier, wherein the at least one row location identifier and the at least one column location identifier are included in the field of one or more marks in the field;
converting the field of one or more marks into an image;
retrieving the data from the image, using the data and the error correcting codes in the field of one or more marks; and
determining if a data record corresponds to the retrieved data to determine if the retrieved data is authentic.

25. The method of claim 24, wherein the data is encrypted, and further comprising decrypting the data after retrieving the data from the image.

26. The method of claim 24, wherein the data is signed with a signature, and further comprising verifying the data based at least in part on the signature.

27. The method of claim 24, wherein the at least one row location identifier is represented by one or more marks, the one or more marks indicating one or more values associated with each of the at least one row location identifier.

28. The method of claim 24, wherein the at least one column location identifier is represented by one or more marks, the one or more marks indicating one or more values associated with each of the at least one column location identifier.

29. The method of claim 24, wherein the error correcting codes used to retrieve the data from the image are one or more Reed-Solomon codes.

30. A system of decoding a field of marks, comprising:
a module operable to receive a field of one or more marks, the field of one or more marks encoding data and error correcting codes, wherein the one or more marks includes at least one row location identifier and at least one column location identifier, wherein the at least one row location identifier and the at least one column location identifier are included in the field of one or more marks in the field;
a module operable to convert the field of one or more marks into an image;
a module to retrieve the data from the image, using the data and the error correcting codes in the field of one or more marks; and
a module operable to determine if a data record corresponds to the retrieved data to determine if the retrieved data is authentic.

31. The system of claim 30, wherein the data is encrypted, and further comprising a module operable to decrypt the data after retrieving the data from the image.

32. The system of claim 30, wherein the data is signed with a signature, and further comprising a module operable to verify the data based at least in part on the signature.

33. The system of claim 30, wherein the at least one row location identifier is represented by one or more marks, the one or more marks indicating one or more values associated with each of the at least one row location identifier.

34. The system of claim 30, wherein the at least one column location identifier is represented by one or more marks, the one or more marks indicating one or more values associated with each of the at least one column location identifier.

35. The system of claim 30, wherein the error correcting codes used to retrieve the data from the image are one or more Reed-Solomon codes.

36. A method of generating an encrypted and decodable identifier, the method comprising the steps of:
receiving a request for data where the data includes an identifier and one or more data codes;
receiving the data codes from a database;
generating a data record including the data codes and an identifier associated with the data codes;
encrypting the data record;
signing the data record using a key associated with the database;
creating one or more error correcting codes;
associating the one or more error correcting codes with the encrypted data record; and
generating a field of one or more marks based at least in part on the encrypted data record with the error correcting codes, the field of one or more marks encoding the data record and the error correcting codes, wherein the one or more marks includes at least one location identifier, wherein the at least one location identifier is included in the field and indicates a position of the marks in the field and an orientation of the field.

37. The method of claim 36 wherein the database includes all data records for at least one of a particular product or a particular product manufacturer.

38. The method of claim 36 wherein the data record is signed either before or after the data record is encrypted.

39. The method of claim 36 wherein said at least one location identifier includes one or both of a row location identifier and a column location identifier.

40. The method of claim 36 wherein a plurality of location identifiers are included in the field so that the relative position of individual marks within the field can be determined even if some of the other marks are obliterated.

41. A method of encoding and decoding a data record including an identifier and data associated with the identifier, the method comprising the steps of:
receiving a request for data where the data includes an identifier and one or more data codes;
receiving the data codes from a database;
generating a data record including the data codes and an identifier associated with the data codes;
encrypting the data record;
signing the data record using a key associated with the database;
creating one or more error correcting codes;
associating the one or more error correcting codes with the encrypted data record;
generating a field of one or more marks based at least in part on the encrypted data record with the error correcting codes, the field of one or more marks encoding the data record and the error correcting codes, wherein the one or more marks includes at least one location identifier, wherein the at least one location identifier is included in the field and indicates a position of the marks in the field and an orientation of the field;
storing the data record in a database;
receiving the field of one or more marks;
converting the field of one or more marks into an image;

retrieving the data record from the image;
retrieving the stored data record from the database; and
comparing the retrieved data record with the stored data record to determine if the field of marks is authentic.

* * * * *